United States Patent

[11] 3,626,286

| [72] | Inventor | George P. Rauchwerger<br>c/o Aqua-Knight, 147 Cromart Court,<br>Sunnyvale, Calif. 94087 |
|---|---|---|
| [21] | Appl. No. | 777,219 |
| [22] | Filed | Nov. 20, 1968 |
| [45] | Patented | Dec. 7, 1971 |

[54] CAPACITIVE MOISTURE CONTROL SYSTEM HAVING A PEAK DETECTOR
11 Claims, 8 Drawing Figs.

[52] U.S. Cl.................................................. 324/61 R, 239/63
[51] Int. Cl...................................................... G01r 27/26
[50] Field of Search............................................. 324/61 M, 61 UC, 61 P; 239/63, 64; 73/73

[56] References Cited
UNITED STATES PATENTS

| 2,304,448 | 12/1942 | Fletcher....................... | 324/61 |
| 2,754,478 | 7/1956 | Goldsmith.................... | 324/61 |
| 3,146,617 | 9/1964 | Klein et al..................... | 324/61 X |
| 3,180,146 | 4/1965 | Hossack....................... | 324/61 UX |
| 3,224,676 | 12/1965 | Rauchwerger............... | 239/64 |
| 2,373,846 | 4/1945 | Olken........................... | 324/61 |
| 3,182,914 | 5/1965 | Hosier.......................... | 239/63 |

*Primary Examiner*—Edward E. Kubasiewicz
*Attorney*—Julian Caplan

ABSTRACT: A meter for measuring moisture in soil electronically uses two probes spaced apart with soil between the probes. The probes may be insulated plates of metal or flat insulated cable made of a plurality of conductors. The circuit has an ultrasonic oscillator which transmits a signal to the probes, which function as a variable capacitor depending upon moisture content of the soil. An integrated-circuit peak detector provides a positive DC voltage proportional to input peak voltage, and its output is measured by a microammeter which thus measures moisture. The output of the detector may be used to control an irrigation valve. Several probes and valves may be used in a system. The soil may be contained in a plastic bag and the electrodes applied to opposite sides of the bag.

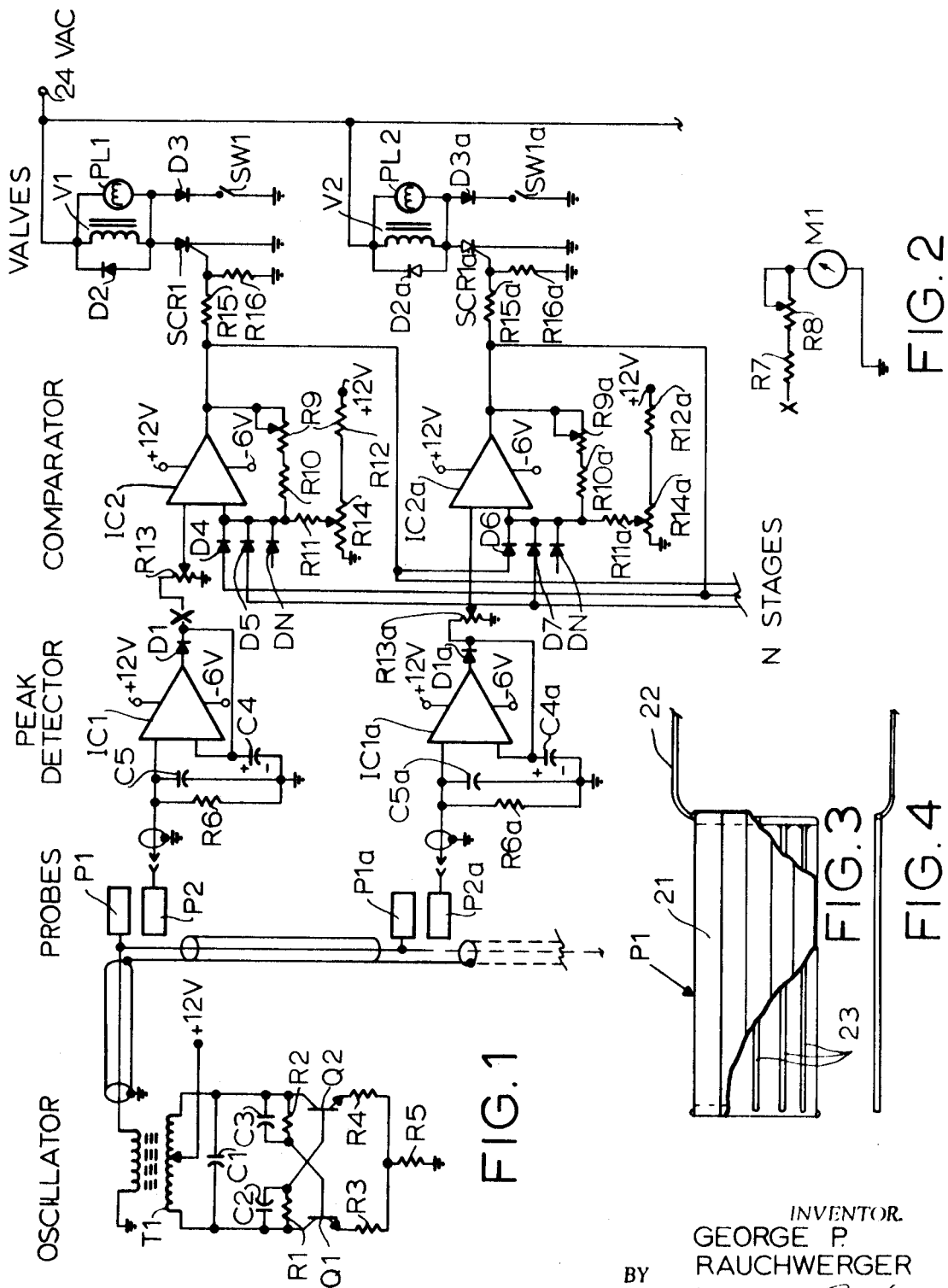

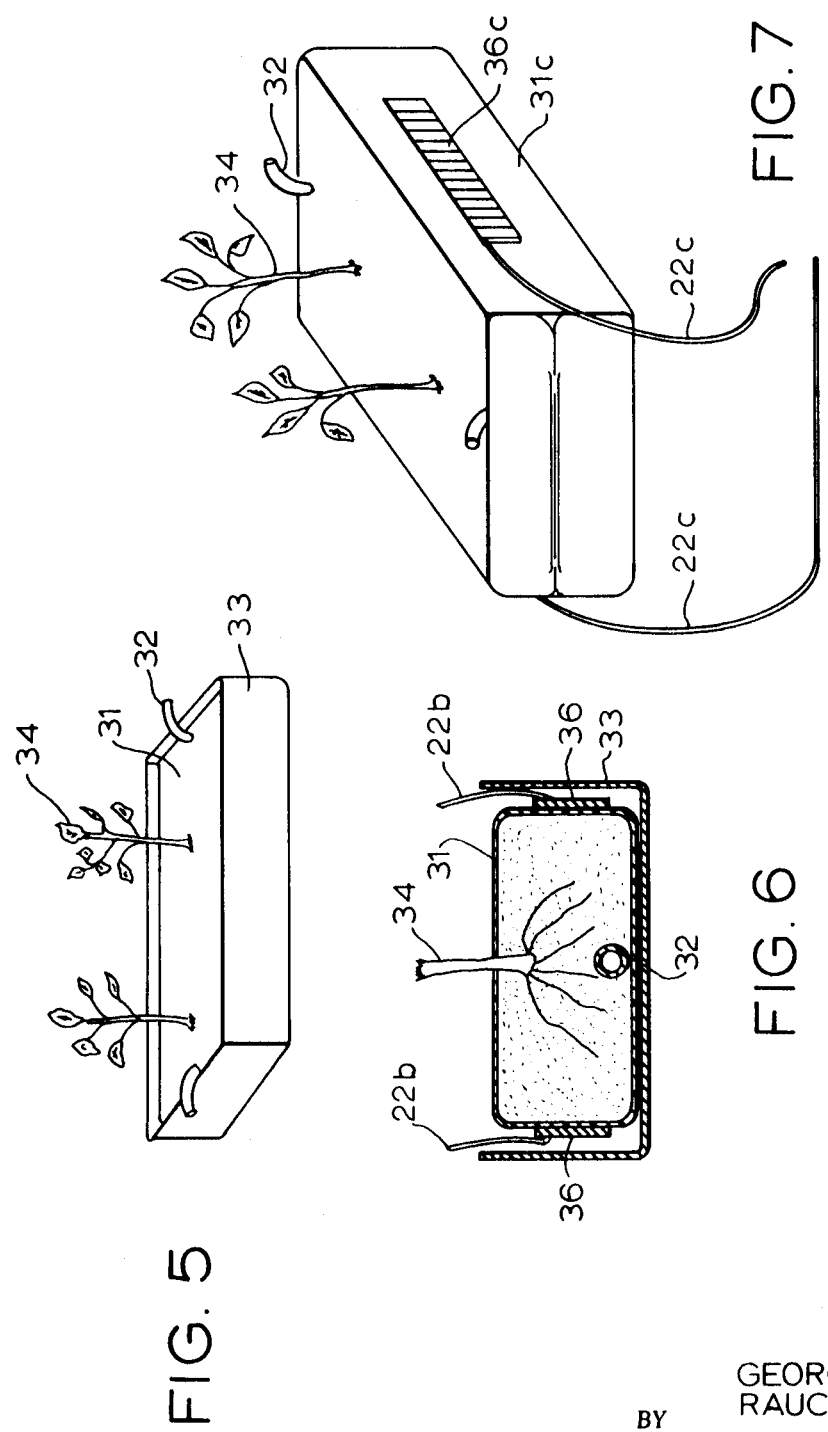

CAPACITIVE MOISTURE CONTROL SYSTEM HAVING A PEAK DETECTOR

This invention relates to a new and improved control for a sprinkler system. More particularly, the invention relates to an ultrasonic moisture-sensing system for an automatic irrigation control and for a moisture-regulating control for a plastic growth chamber.

The principal object of the present invention is to accurately measure or sense the moisture in soil by electronic means wherein the moisture of the soil affects the capacitance between two insulated probes. Thus, a distinguishing feature of the invention is the fact that the resistance or conductance of the soil does not affect the system and neither does the absorption of water from the soil affect the system.

Another feature of the invention is the provision of probes which are protected from contact with the soil and thus are not subject to deterioration. Further, the construction of the probes permits low manufacturing cost.

Another feature of the invention is the provision of a meter suitably calibrated to read directly the percentage of moisture of the soil under test.

Still another feature of the invention is the provision of automatic means to control irrigation to regulate the percentage of moisture in a single area or multiple areas.

Another feature of the invention is the fact that the moisture-measuring means has no mechanical movements but, on the contrary, employs solid-state electronic components which insure high reliability of operation, low maintenance, portability, and low-voltage operation.

Another feature of the invention is the provision of manual controls to override electronic controls for the automatic irrigation system.

Still another object of the invention is the provision for measuring the percentage of moisture and for automatically controlling the amount of moisture in a plastic growth chamber for plants. The probes are part of, or affixed to, the growth chamber and externally attached so that the probes do not come in direct contact with the soil.

A further feature of the invention is use as a means for controlling the average moisture in a plurality of growth chambers or soil areas.

Other objects of the present invention will become apparent upon reading the following specification and referring to the accompanying drawings in which similar characters of reference represent corresponding parts in each of the several views.

In the drawings:

FIG. 1 is a circuit diagram of a multiarea automatic sprinkler control.

FIG. 2 is a fragmentary circuit diagram showing a meter inserted in a portion of the circuit of FIG. 1.

FIG. 3 is an elevational view partly broken away in section of a preferred form of probe.

FIG. 4 is a top plan of the structure of FIG. 3.

FIG. 5 is a perspective view of a plastic growth chamber for plants.

FIG. 6 is a transverse sectional view through the chamber of FIG. 5.

FIG. 7 is an enlarged perspective view of a growth chamber showing the invention incorporated therein.

Figure 8:
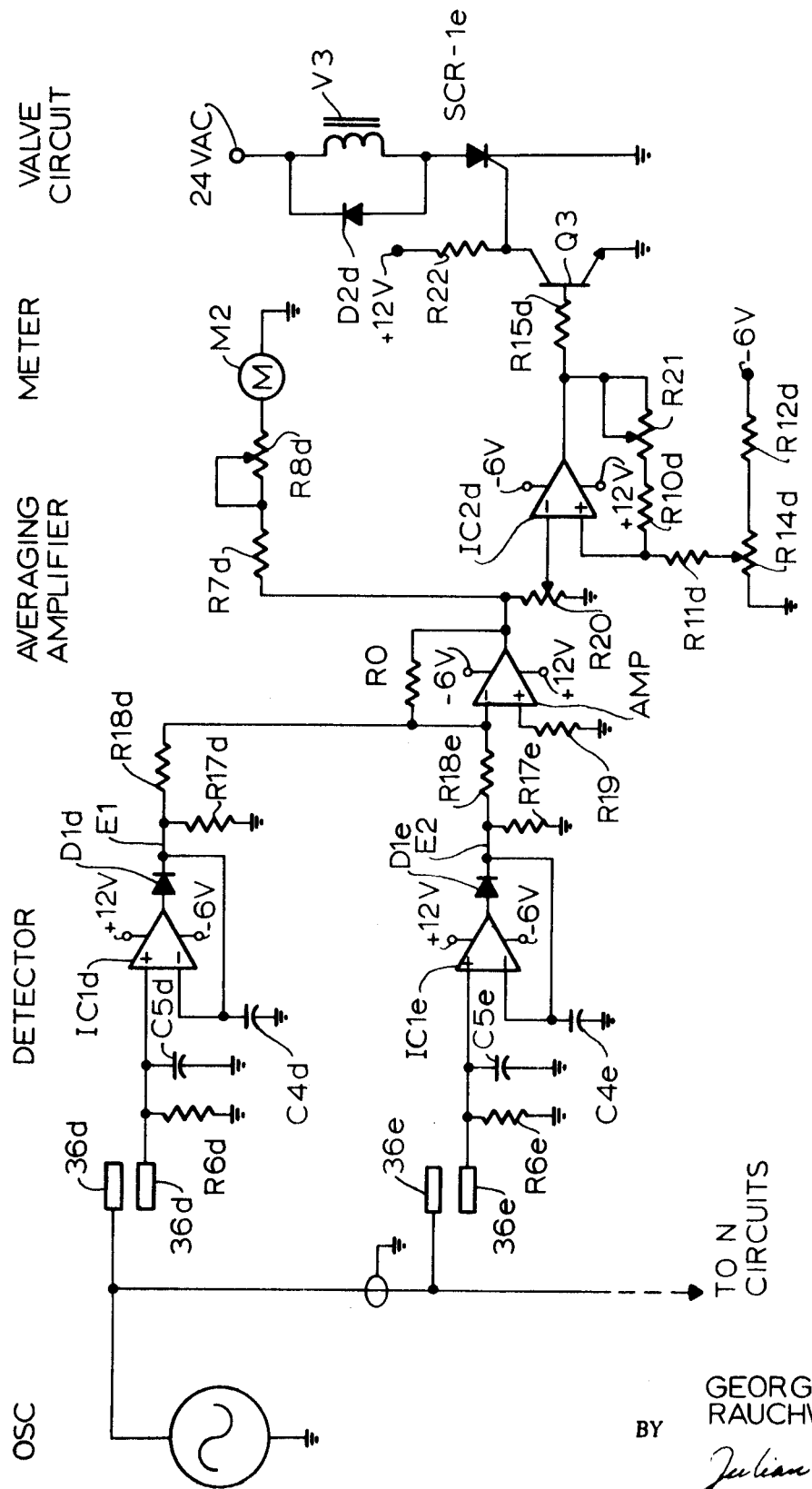
FIG. 8 is a schematic view of a circuit for averaging moisture in a plurality of areas or chambers for automatic irrigation control.

The present invention finds practical adaption of the principle that the moisture between two plates or other probes is directly proportional to the capacitance between them, as is derived from the expression of the capacitance for a parallel plate capacitor:

$$C = \epsilon A/d$$

where:
$C$ = capacitance in farads
$\epsilon$ = permittivity, coul$^2$/nm.$^2$
$A$ = Area of the plates, in m.$^2$
$d$ = distance between the plates, in m.

where: $K$ = dielectric coefficient
$\epsilon_0$ = permittivity in vacuum = $8.85 \times 10^{-12}$ coul$^2$/nm.$^2$
$\epsilon$ for water = $771 \times 10^{-12}$ coul$^2$/nm.$^2$
$K$ for water = 81
$K$ for air = 1

If the plates of the capacitor are submerged entirely in water, then by definition, the volume of water between the plates is 100 percent, therefore the capacitance between the plates will hold true to the formula with $K=81$. If the volume of water between the plates is a fraction of 100 percent, then the capacitance also changes by the same fraction because the effective area of the plates is only the area in contact with the water.

If the plates are in porous medium such as soil, the volume of water between the plates is directly proportional to the capacitance between the plates.

Thus, the formula for measuring moisture with the ultrasonic moisture meter would be written as:

$$\% \text{ Moisture} = \epsilon_{H_2O} \, A/d \times \% V_{H_2O}$$

where the meter is calibrated to read 100 percent when the probes or plates are fully submerged in water.

Referring now to FIGS. 1 and 2, there are four basic subcircuits comprising the instrument.

$A$ = the ultrasonic oscillator
$B$ = the moisture probes
$C$ = the detector
$D$ = the meter (See specifically FIG. 2)

The oscillator transmits a sinusoidal signal to the probes P1, P2 at a frequency of about 75 kHz. and an amplitude of about 100 V.P.P.

Since the probes are essentially a variable capacitor, for this explanation, $C_r$, whose capacitance varies with moisture, therefore has a capacitive reactance, $X_c$, which changes accordingly. $X_{C_x} = 1/2\pi f C_r$.

As $X_{C_x}$ varies, the voltage across $C_r$ varies in direct proportion. Then the voltage to the input of the integrated circuit detector is given by the capacitive divider equation:

$$E_i = E_0 \, C_r/(C_x + C5)$$

where: $E_i$ = Voltage at input of detector
$E_0$ = Oscillator voltage present at P1
$C_x$ = Probes
$C5$ = Capacitor across input detector
$C5 \geq 20(C_r)$ Since $C5$ is much greater than $C_r$, then the voltage variation $E_i$ due to $C_r$ is very nearly linear. This is a necessary condition for an accurate meter indication. Resistor R6 prevents the input from floating.

The detector consists of an integrated circuit comparator IC1 connected to operate as a positive peak detector. Capacitor C4 is charged to the peak value of the input waveform through diode D1 by comparing the voltage across the capacitor and across the input. The output is a positive DC voltage proportional to the input peak voltage.

Referring to FIG. 2, the output of the detector may be connected at point X shown in FIG. 1 to microammeter M1, through a current-limiting resistor R7, and a calibrating potentiometer R8. Full-scale reading is 100 microamperes. The power supplies for the ultrasonic moisture meter may be high-quality batteries in order to make this instrument portable. However, the supplies may be taken from any source, and may be of any form as long as they provide the necessary DC voltages to the various circuits. For example, in the automatic irrigation control shown in FIG. 1 the supplies are derived from the 110 V.A.C. line.

FIGS. 3 and 4 show the configuration of the identical probes, P1 and P2. They are made of an electrically conducting material, insulated with a good waterproof coating 21, and with a lead wire 22 connected to the probe for external connection to the measuring circuits. The probes can vary in shape or dimensions, affecting only the magnitude of capacitance between them. The probes shown in FIGS. 3 and 4 consist of a flat cable made from 24 round insulated conducthe connecting lead for the measuring circuit. The other ends of the conductor are left open. Both ends of the cable are insulated and waterproofed. The approximate dimensions are 12 inches long × 1 in. wide × 1/16 inch thick. Another form of probe is a flat metal plate (not shown), insulated and with a wire lead connected to it.

The automatic irrigation control circuitry of FIG. 1 utilizes the same principle of moisture measurement as the moisture meter. The components to the right of reference symbol X are used in FIG. 1, as are the parallel circuit components for a second moisture control area designated by subscripts $a$ in FIG. 1.

In this case the output of the detector drives a comparator circuit IC2, which in turn controls the solenoid valve V1 with a solid-state switch.

The comparator is an integrated circuit IC2 which compares the output voltage of the detector against a manually controlled reference voltage obtained through the resistive network R12, R13, R14. R13 is a calibration control; R14 determines the maximum percentage moisture desired, and R9 determines the percentage moisture differential between maximum and minimum percentage of moisture.

The output of comparator IC2 is either a logic "high" (+3.2 v.) or a logic "low" (−0.5 v.), depending on the state of the input voltage. If the input voltage at terminal 3 of the comparator is greater than the reference voltage, the output is "low," and if the input is less than the reference voltage, the output is "high." The hysteresis of the comparator is determined by R9, R10 and R11.

The output of the comparator IC2 is then connected to voltage divider R15 and R16 and the gate of the solid-state switch SCR1 (silicon-controlled rectifier). When the voltage at the gate of SCR1 is at a "high" state, the SCR turns ON, allowing solenoid valve V1 to be energized. When the voltage at the gate of SCR1 is at a "low" state, the SCR turns OFF, and consequently the solenoid valve V1 turns OFF.

Diode D2 reduces the inductive transients across the solenoid valve V1 when the current through the solenoid reverses on the negative cycle of the forcing voltage.

The forcing voltage for the solenoid valve V1 and SCR circuit is low voltage, 60 cycles, obtained from a stepdown transformer, because of the nature of the SCR. SCR1 conducts on positive pulses but turns off with negative pulses. Thus, a special turnoff circuit for the SCR is not needed as it would be if the forcing voltage were DC.

Switch SW1 and diode D3 turn on the solenoid valve V1 by manual means, overriding the automatic control. PL1 is an indicator light to show which valve is ON.

In a multiple system where only one solenoid valve is to be turned on at a time, thus keeping the other circuits OFF, a logic circuit to accomplish this is provided. This logic circuit consists or properly interconnecting the output of the comparators IC1, IC1$a$, etc. to an input diode "OR" gate comprised of diodes D4, D5, DN, D6, D7, DN; where the number of diodes is equal to one less than the total number of solenoid circuits.

It must be understood that these circuits may vary slightly depending on the particular application or adaptation of this system, and that modifications of these circuits will not constitute a change in the original concept of measuring moisture as presented in the above paragraphs.

In one adaptation of the invention, suitable component values for the circuits illustrated in FIGS. 1 and 2 are:

| | | | |
|---|---|---|---|
| R1, R2= | 6.8KΩ | T1—D41811-16 | |
| | | Primary = | |
| R3, R4= | 100Ω | 60t. center tapped. | |
| | | Sec. 60t. | |
| R5, R6= | 1KΩ | | |
| R7 | 10KΩ | | |
| | | Q1, Q2=2N3567 | |
| R8 | 25KΩ | | |
| R9 | 100KΩ | | |
| | | IC, IC2=μA710 | |
| R10 | 10K | | |
| R11 | 1K | | |
| R12 | 11.5K | | |
| R13 | 20K | | |
| | | SCR1—C106B1 | |
| R14 | 500Ω | | |
| | | D1, D4, D5, DN=FD100 | |
| R15 | 2K | D2, D3=1N2071 | |
| R16 | 1K | | |
| | | V1—STD 24 VAC, 0.5A, | |
| | | Solenoid valve. | |
| C1 | 0.006 μf. | | |
| C2, C3 | 0.001 μf. | | |
| C4 | = 100μf. | | |
| C5 | = 0.01μf. | | |

A recent development in horticulture and agriculture is the use of plastic plant growth chambers. The chamber consists of a bag 31 of polyethylene or other suitable material which is filled with soil, a conditioner such as peat moss, fertilizers, and similar plant-growth-promoting substances. A perforated hose 32 is installed in the bag and water is added to maintain the contents of the bag at a desired percentage of moisture. Preferably, bottom, ends, and sides of the bag fit within a shallow tray 33 or open-top cardboard box which maintains the bag shape. The top of the bag is ruptured for the insertion of seed or small plants 34 which then grow entirely in the bag. This system is particularly desirable for expensive plants, such as tomatoes, and flowers or various types, and finds particular use where climatic conditions are not otherwise favorable to the growth of certain plants.

The present invention is adapted to sensing and controlling the moisture within the plastic growth chamber 31. As shown in FIG. 6, an electrically conductive tape 36 is applied to the exterior of opposite sides of the growth chamber. Such a tape may be Scotch Brand pressure-sensitive aluminum foil tape No. 425. Other tapes, such as copper foil tape, may be used. The tape is attached to the sides of the bag and wires 22$b$ are connected to one end of each tape by means of a small rivet (not shown), or a conductive adhesive or epoxy glue, or by merely folding one end of tape 36 around a stripped terminal or wire 22$b$ with the wire in contact with the adhesive side of the tape and burnishing the tape onto the wire.

In the form of the invention shown in FIG. 7 patches of electrical conductive paint 36$c$ or other compound now readily commercially available are applied to opposite sides of bag 31$c$ and the ends of the wires 22$c$ are glued to the paint or compound.

The probes 36, 36$c$ shown in FIG. 6 and 7 are similar in function to the probes P1 and P2 shown in FIG. 1, and in other respects the circuits of FIGS. 1 and 2 are similar for sensing or automatically controlling the moisture within chamber 31.

It is sometimes desirable to sense the average moisture content of a plurality of soil areas (as in FIG. 1) or a plurality of chambers 31. FIG. 8 illustrates an averaging circuit. The portion designated "OSC" may be similar to that portion designated "Oscillator" in FIG. 1 or may be of a different type. Probes designated 36$d$, 36$e$, etc., may correspond to the probes 36, 36$c$ of FIG. 6 and 7, respectively, or to probe P1 of FIG. 4 or the like. The detector portions correspond generally to the portions marked "Peak detector" in FIG. 1, and similar components carry the same reference symbols followed by subscripts $d, e$.

The outputs of the detectors, designated $E_1$ $E_2$ pass through resistors R18$d$, R18$e$, and thence to averaging amplifier "AMP." Note R0 across the amplifier and R19. The output of the amplifier is designated E0.

The valve circuit for this form of the invention differs somewhat from that shown in FIG. 1. R20 is a calibration control for the system which changes sensitivity to allow for various probes. R8$d$ permits meter calibration. R21 provides for percentage moisture differential control by changing the hysteresis of comparator IC2$d$. R14$d$ controls the maximum percentage of desired moisture. The components of FIG. 8 are generally the same as the corresponding components in FIG. 1 or FIG. 2, with the following exceptions:

| | |
|---|---|
| R7$d$ | 1K |
| R12$d$ | 5.6K |

| | |
|---|---|
| R14d | 500Ω |
| R17d, R17e | 15K |
| R15d | 33K |
| R20 | 2K |
| R21 | 100K |
| R22 | 10K |
| C4d, C4e | 1 μf. |
| AMP | μA741 |
| Q3 | 2N3567 |

The relationship of the components is as follows:

$R_0 = R_1$ divided by number of inputs ($N$).

$R_2 = R_0/2$ $E_0 = -R_0/R_1(E_1 + E_2 + E_3 + ...E_N)$

The unit of the present invention may be used as a liquid level control to sense and/or control the level in a tank or the like. The probes are suspended in a tank, swimming pool or other receptacle for liquid and used to control a valve or provide a reading of a meter.

What is claimed is:

1. In a moisture control system wherein the moisture of a medium is sensed and controlled, a pair of probes, insulation means for said probes completely insulating each said probe from said medium and from the other probe, each said probe being flexible, said probes being installable in said medium at selectively varying distances from each other, each said probe being completely surrounded by said medium when imbedded therein, an ultrasonic oscillator providing at its outputs a sinusoidal output signal, one of the outputs of said oscillator electrically connected to one of said probes and the other output to ground, a positive peak detector having one input connected to the other of said probes and the other input to ground, and means controlled by said detector to sense the capacitance across said probes and thereby to sense the percentage of moisture in said medium.

2. A system according to claim 1 in which said means comprises a comparator circuit comprising adjustable means providing a manually controlled reference voltage and a circuit accepting the outputs of said detector and said reference voltage for comparing the output voltage of said detector against said manually controlled reference voltage, a solid-state switch actuated by said comparator circuit, a solenoid valve controlled by said switch, and a water pipe in which said valve is installed.

3. A system according to claim 2 which further comprises a second pair of probes each completely insulated from said medium and from the other probe and each imbedded directly in a second medium in spaced-apart relation and unsupported except by said medium, one of said second pair of probes connected to the output of said oscillator, a second detector, one input of said second detector connected to the other of said second pair of probes, said means further comprising a second comparator circuit comprising second adjustable means providing a manually controlled second reference voltage and a second circuit accepting the outputs of said second detector and said second reference voltage for comparing the output voltage of said second detector against said second reference voltage, a second solid-state switch actuated by said second comparator circuit, a second solenoid valve controlled by said second switch and a second water pipe in which said second valve is installed, and a logic circuit to turn on only one said valve at a time, said logic circuit including an "OR" gate having a plurality of diodes, said gate connected to the output of said comparator circuits, the number of diodes equaling one less than the number of solenoid valves.

4. A system according to claim 2 which further comprises a second pair of probes each imbedded directly in a second medium in spaced-apart relation and insulated from said second medium and from each other, one of the outputs of said oscillator connected to one of said second probes, a second detector, one of the inputs of said second detector connected to the other of said second probes and the other input to ground, an averaging amplifier receiving the output of each said detector, and a valve circuit operable to open said valve when the average moisture sensed by said probes in less than a predetermined percentage.

5. A system according to claim 4 which further comprises individual identical first resistors interposed between the output of each detector and one input of said amplifier, a second resistor between the other input of said amplifier and ground, and a third resistor across said amplifier and wherein there is the following relationship:

said third resistor equals the value of any of said first resistors divided by the number of detectors;

said second resistor equals half said third resistor;

the output of said amplifier equals minus the value of the third resistor times the sum of the outputs of said detectors divided by said first resistor.

6. A system according to claim 1 in which said probe comprises at least one conductor electrically insulated from the exterior in a plastic sheath, one end of said conductor electrically connected to a lead wire for said probe which extends outside said sheath.

7. A system according to claim 1 in which said means comprises a microammeter.

8. A system according to claim 1 in which the signal of said oscillator is approximately of a frequency of 75 kHz. and an amplitude of about 100 V.P.P.

9. In a moisture control system a nonconductive plastic bag, a medium whose moisture is to be controlled filling said bag, said bag when filled being of fixed shape, a first probe on the exterior of said bag, a second probe on the exterior of said bag opposite said first probe, insulation means completely insulating said probes from said medium and from each other, an ultrasonic oscillator providing at its outputs a sinusoidal output signal, one of the outputs of said oscillator electrically connected to one of said probes and the other output to ground, a positive peak detector having one input connected to the other of said probes and the other input to ground, and means controlled by said detector to sense the capacitance across said probes and thereby to sense the percentage of moisture in said medium in said bag.

10. A system according to claim 2 in which each said probe comprises a strip of conductive foil and adhesive to attach said foil to said bag.

11. A system according to claim 2 in which each said probe comprises a strip of conductive compound applied to said bag.

* * * * *